United States Patent [19]

Albrigtsen et al.

[11] Patent Number: 4,877,046
[45] Date of Patent: Oct. 31, 1989

[54] CLOSING AND INJECTION VALVE ESPECIALLY FOR HOT GAS DEFROSTING IN FREEZING AND COOLING INSTALLATIONS

[75] Inventors: Rolf H. Albrigtsen, Norge; Per R. Samuelsen, Oslo, both of Norway

[73] Assignee: A/S Finsam International Inc., Oslo, Norway

[21] Appl. No.: 222,079

[22] PCT Filed: Dec. 8, 1987

[86] PCT No.: PCT/NO87/00078
§ 371 Date: Aug. 15, 1988
§ 102(e) Date: Aug. 15, 1988

[87] PCT Pub. No.: WO88/04383
PCT Pub. Date: Jun. 16, 1988

[30] Foreign Application Priority Data

Dec. 9, 1986 [NO] Norway .................................. 864941

[51] Int. Cl.⁴ ........................ F16K 49/00; F25B 41/04
[52] U.S. Cl. ..................................... 137/107; 62/278; 137/627.5
[58] Field of Search ................ 62/81, 278; 137/102, 137/107, 627.5

[56] References Cited

U.S. PATENT DOCUMENTS

| | | | |
|---|---|---|---|
| 3,034,527 | 5/1962 | Hennels | 137/102 |
| 3,498,056 | 3/1970 | Avery | 137/107 X |
| 3,519,011 | 7/1970 | Pennanen | 137/102 |
| 3,665,723 | 5/1972 | Okutus | 62/278 X |
| 4,057,074 | 11/1977 | Fischer | 137/107 |
| 4,279,129 | 7/1981 | Cann | 62/278 |

Primary Examiner—Robert G. Nilson
Attorney, Agent, or Firm—Finnegan, Henderson, Farabow, Garrett & Dunner

[57] ABSTRACT

A valve for closing a main fluid flow through a main flow passage having a valve stem with a valve head for engaging a valve seat to close the passage, the valve stem carrying at the end remote from the valve head a piston which can be actuated by a closing fluid against spring action to move the valve head (48) into closed position, the valve stem being hollow and is open at the valve head end and at the opposite end has openings opening into the interior of the hollow valve stem, and the piston is mounted for axial movement on the valve stem to allow further movement towards the valve seat against spring action when the valve head has engaged the valve seat and the valve stem has come to a halt, said further movement relative to the valve stem opening a passage into the openings in the valve stem, whereby closing fluid will be injected into the main flow passage at one side of the valve seat through the valve stem.

4 Claims, 3 Drawing Sheets

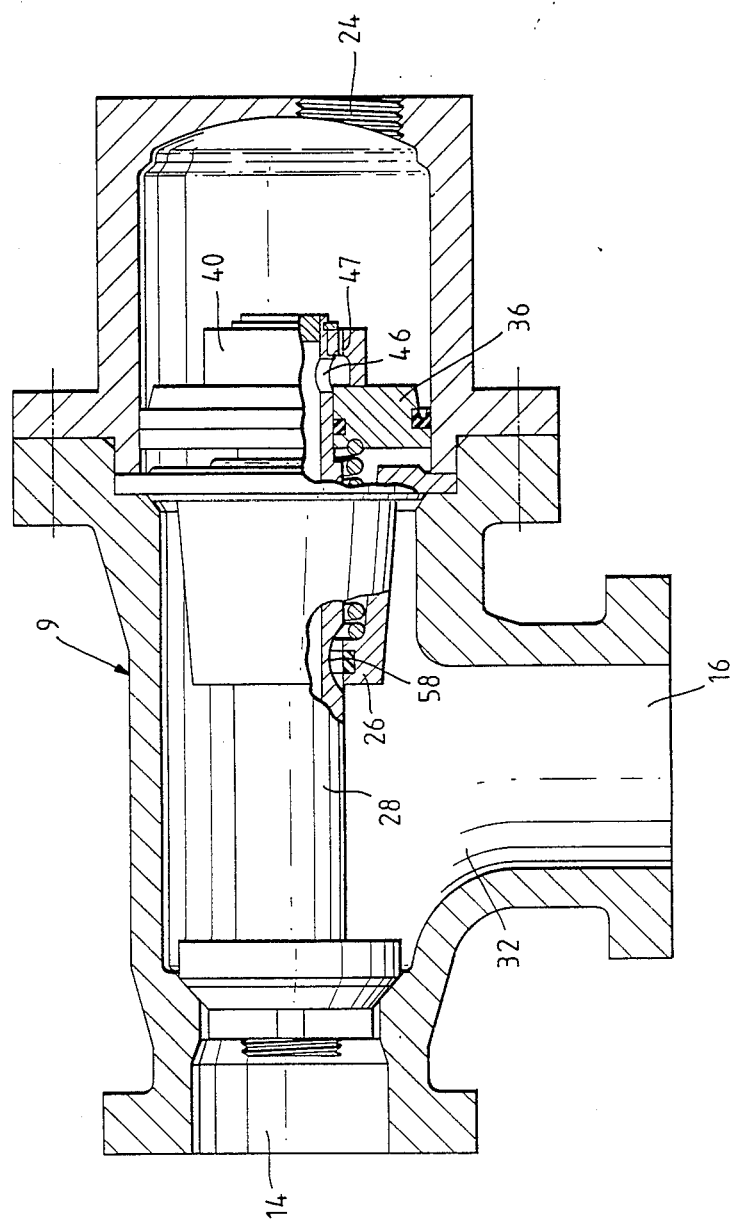

CLOSING AND INJECTION VALVE ESPECIALLY FOR HOT GAS DEFROSTING IN FREEZING AND COOLING INSTALLATIONS

The invention relates to a valve for shutting off or closing a main fluid flow through a main flow passage, comprising a valve stem having a valve head which may be operated to engage a valve seat in order to close said passage, the valve stem carrying at the end remote from the valve head a piston which operates in a cylinder and can be actuated by a closing fluid against spring action in order to move the valve stem and the valve head into closed position.

The valve according to the invention is especially designed for hot gas defrosting in freezing or cooling installations comprising a compressor, a condenser and an evaporator of the dry or filled type.

The compressor, which may be of the piston, worm, lamella or turbo type, draws the vapourous cooling agent from the evaporator and thereby maintains a low pressure therein. In the compressor the gas is compressed to the pressure determined by the operating condition of the condenser. Through the compression an amount of heat corresponding to the compression work is supplied to the vapour. This amount of heat together with that supplied in the evaporator is removed by heat exchange in the condenser, in which the cooling agent is condensed to a liquid. The liquid is then passed to a suitable throttling means in which the pressure is reduced to the pressure in the evaporator. By the reduction of the pressure a small amount of the liquid will evaporate, so that the remainder of the liquid reaches the evaporation temperature in operating condition. In filled evaporators liquid and gas will be separated in a liquid separator. The liberated amount of vapour from the pressure reaction is withdrawn to the compressor together with the amount of vapour formed by the supply of heat to the evaporator. Thereby the circuit is completed.

A filled evaporator system in general consists of a liquid separator associated with one or more evaporator sections. The liquid from the liquid separator is made to circulate either by automatic circulation or by forced circulation. In the case of a forced circulation it is possible to circulate far more liquid through the system (for instance 4 to 6 times more) than in the case of automatic circulation. The operating liquid head and the pressure losses in the system are clearly related, and especially an automatic circulation system must therefore be designed in such a manner that the pressure losses in the supply pipes and liquid passages are small.

A dry evaporator system has no liquid separator, and the pressure is reduced in the inlet to the evaporator by means of a suitable throttling means, usually a thermostatic expansion valve. The vapour leaves the outlet from the evaporator in dry-saturated or overheated condition.

Defrosting of the evaporator sections is necessary in case white frost and/or ice is formed on the outer surfaces of the evaporator because of the purpose and the operating condition of the installation. This will usually be an undesirable effect, but it can be utilized for the production of ice. For defrosting the evaporator sections hot gas may be used, which is supplied from the pressure side of the compressor or from a reservoir.

In principle a hot gas defrosting is performed by shutting off the entire evaporator system or parts thereof and supplying hot gas on the evaporator side of the closing point. This hot gas will largely condense in the interior of the passages in the evaporator, and the evaporator must be suitably drained, either to a suction accumulator, a return conduit or a liquid separator or to the remaining evaporator system. A suitable regulating system maintains the pressure in the defrosting section at the level providing an effective defrosting and drainage. When the defrosting is completed, the supply of hot gas should cease and the flow of cooling agent be resumed. The supply of hot gas can be designated as an injection, and as will appear from the preceding description it is to be effected on the evaporator side of the closing point and in the opposite direction of the closed cooling agent flow.

Known closing valves such as pilot controlled shut-off valves require the use of separate control devices for opening and closing the valve. A further valve is used to supply the injection fluid. Suitable directly controlled solenoid valves giving a sufficiently low pressure loss are only available for relatively small dimensions. Commercial valves also have a comparatively high flow resistance in open condition because of restrictions in the flow passage, and they have a complicated structure.

Actuator controlled ball valves constitute an exception, but require the availability of compressed air or hydraulic medium. Also, pilot valves are required to provide the control functions. Electrically controlled actuators are often unreasonably expensive, but otherwise provide a good alternative. However, leakages in the stuffing box of the ball valve often make such actuators unsuitable for use in cooling installations.

The object of the invention is to provide an improved valve of the type referred to initially, while at the same time combining the closing and the injection functions in a simple manner. The valve according to the invention is characterized in that the valve stem is hollow and at the end at which the valve head is provided, is open and at the opposite end has openings opening into the interior of the hollow valve stem, and that the piston is mounted for axial movement on the valve stem for further movement towards the valve seat against spring action when the valve head has engaged the valve seat and the valve stem has therefore come to a halt, said further movement relative to the valve stem opening a passage into the openings in the valve stem, whereby closing fluid will be injected into the main flow passage at one side of the valve seat through the valve stem.

Accordingly, the valve according to the invention uses the injection fluid as a medium which provides the closing of the main fluid flow. At the same time the design of the valve is such as to provide a low pressure loss in open position.

The function of the valve depends on a correctly balanced relationship between the pressure of the injection fluid and the available volumetric flow on one hand and the volume of the recipient (the evaporator) on the other hand, and on the pressure on both sides of the valve.

The valve will maintain a certain pressure difference between the pressure of the injection medium and thereby the recipient (the evaporator) on one hand and the pressure in the main flow passage on the other hand.

In operation of the valve according to the invention the medium to be injected (the hot gas) is thus supplied to the distal side of the piston, whereby piston and valve stem are advanced until the valve head shuts off the main flow. The moment the valve head engages the valve seat the movement of the valve stem is halted. However, the piston continues and thereby opens passages for the supply of injection fluid through the piston rod (valve stem).

The valve according to the invention has a substantially simpler structure than valves according to the state of the art, and at the same time the control function is substantially simplified. The valve is further easy to assemble and disassemble. The valve can easily be provided with a simple and substantially unobstructed passage in open position so that the pressure loss is low. The valve can be reopened by shutting off the injection fluid, whereupon the pressure is equalized by a mechanical throttling element or a controlled equalization through a valve.

When the valve is used for hot gas defrosting in freezing or cooling installations as indicated above, the main flow passage of the valve is connected into a return flow passage from the evaporator to a liquid separator, and the closing and injection fluid is periodically supplied from the pressure side of the compressor.

Further objects, features and advantages of the present invention will be apparent from the subsequent description, reference being had to the drawing.

FIG. 3 is a corresponding section through the valve at the moment the valve head engages the valve seat, but before the passages for supplying the closing fluid have been opened.

Figure 1:
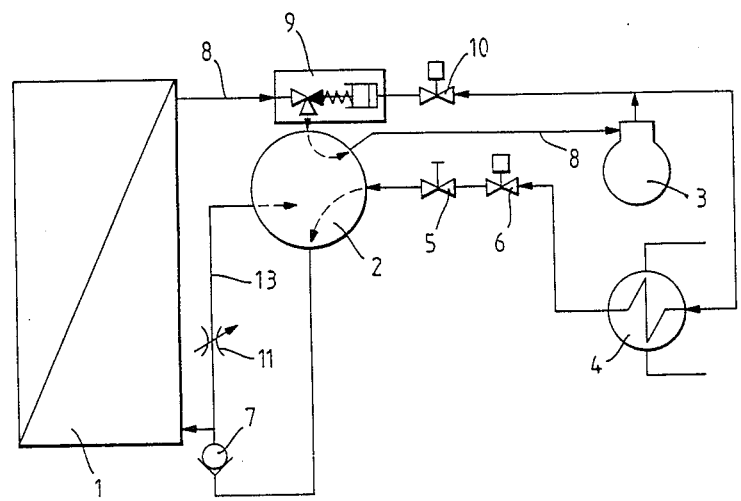
FIG. 1 is an example of a schematic flow diagram for a cooling installation containing a valve according to the invention.

In FIG. 1 a simplified cooling installation is shown schematically, said installation comprising an evaporator 1, a liquid separator 2, a compressor 3 and a condenser 4. Between the condenser 4 and the liquid separator 2 there is connected a throttle means 5, for instance in the form of a hand operated expansion valve. 6 is a control means in the form of a solenoid valve for the throttle means 5. Between the lower end of the liquid separator 2 and the lower end of the evaporator 1 there is connected a check valve 7 preventing gas and the condensate formed during hot gas defrosting from flowing in an uncontrolled manner back through the supply conduit from the liquid separator 2. From a place in the supply conduit between the check valve 7 and the lower end of the evaporator 1 a conduit 13 leads to the liquid separator 2. The conduit 13, which contains a schematically indicated throttle means 11, serves to drain the evaporator 1 for liquid in order to maintain a sufficient defrosting pressure and provide pressure equalization between the evaporator and the liquid separator 2 when the hot gas supply is shut off.

In the return conduit 8 from the evaporator 1 through the liquid separator 2 to the compressor 3 there is connected a valve 9 according to the invention. This valve normally keeps the return conduit 8 to the compressor open. However, upon opening of a solenoid valve 10 hot gas from the pressure side of the compressor 3 may be supplied to the valve 9 in order to close or shut off the return conduit 8 and inject hot gas into the evaporator 1 in the opposite direction.

Figure 2:
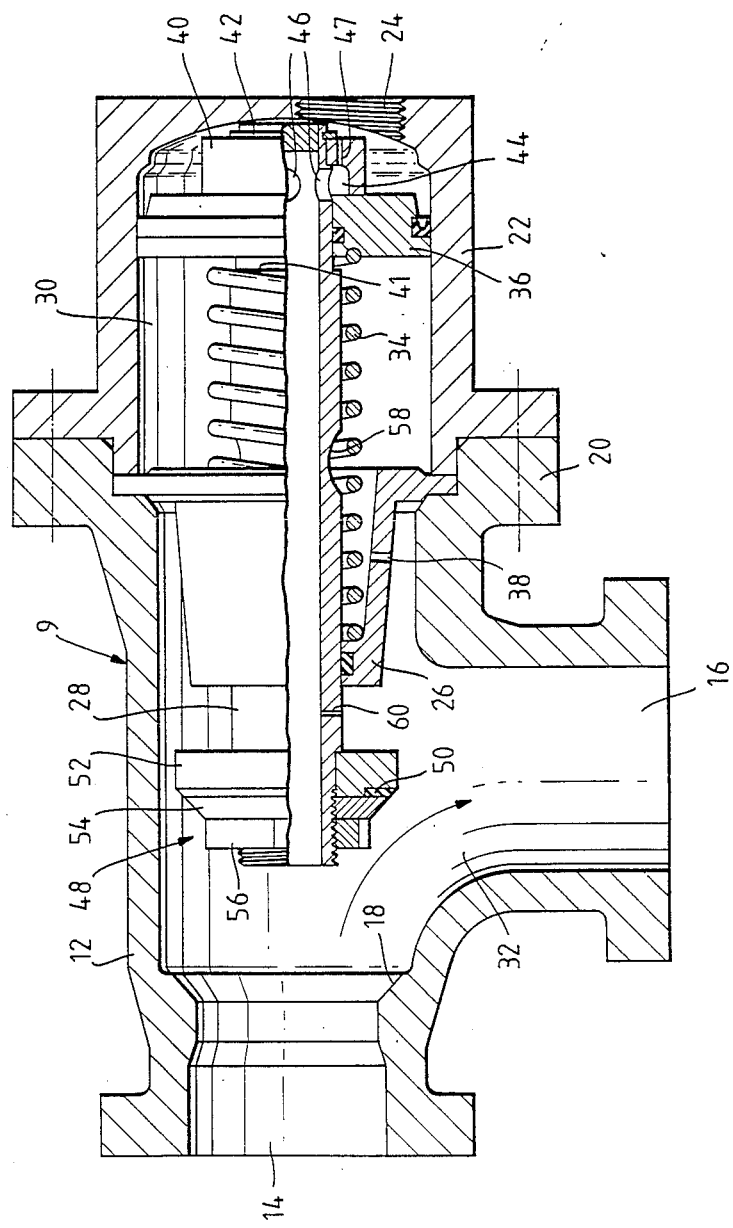
FIG. 2 is an axial section through the valve in open position.

The valve 9 is further shown in FIG. 2. As illustrated the valve comprises a valve housing 12 having an inlet 14 and an outlet 16, a valve seat 18 and a flange 20 for connection with a cylinder housing 22 having an opening 24 for the connection of a gas conduit.

Between the valve housing 12 and the cylinder housing 22 there is clamped a cup-shaped guide 26 for a valve stem 28. The guide 26 further separates the interior 30 of the cylinder housing 22 from the flow passage 32 between the inlet 14 and the outlet 16. Finally the guide 26 constitutes an abutment for a helical spring 34, which acts on a piston 36. A pressure equalization passage 38 is provided in the wall of the guide 26. The piston 36 is mounted on the valve stem 28 for restricted movement between a shoulder 41 and the lower end of a cap 40, which is secured at the outer end of the valve stem 28 between a shoulder and a locking ring 42. The cap 40 forms an annular chamber 44 which communicates with the interior of the hollow valve stem 28 through openings 46 therein. In the cap 40 there is a throttle passage 47, the function of which will be discussed later.

At the end of the valve stem 28 opposite the cylinder chamber 30 the valve stem carries a valve head 48 comprising a sealing ring 50 clamped between two disks 52, 54, which are secured in place by a nut 56 and a locking plate which is not illustrated. The design of the valve head provides for automatic centering in the valve seat 18, and the tapering shape prevents radial extrusion of the sealing ring 50.

On the periphery of the valve stem 28 there is milled an axial groove 58 which provides pressure relief between the cylinder chamber 30 and the flow passage 32 shortly before the valve head 48 engages the valve seat 18. Finally, a throttle passage 60 may be provided in the valve stem 28, the function of which will be discussed later.

When the main flow passage 32 from the inlet 14 to the outlet 16 is to be closed and a fluid injected in the inlet 14 for flow in the opposite direction of the main fluid flow, the injection fluid will be supplied through the opening 24. Provided that the pressure of the injection fluid is sufficiently high to overcome the force of the spring 34 and the pressure in the cylinder chamber 30, the valve stem 28 will move to the left towards the valve seat 18. The spring force will keep the piston 36 in engagement with the cap 40, the area of the annular chamber 44 being so dimensioned that the positive pressure force exceeds the forces of inertia on the valve stem 28 during acceleration towards the valve seat 18. The piston 36 and the valve stem 28 will thus move with the same speed towards the valve seat 18.

The passage 38 is so dimensioned that the gas in the cylinder chamber 30 will be slightly compressed. The purpose thereof is to reduce the speed with which the valve stem 28 is moved, so that the impact against the valve seat 18 is damped. Shortly before the valve head 48 engages the valve seat 18, the groove 58 has arrived in such a position that the compressed gas in the cylinder chamber 30 is released, see FIG. 3, so that the pressure is approximately equalized in the moment when the valve head engages the valve seat. The full sealing pressure is therefore obtained immediately.

Figure 4:
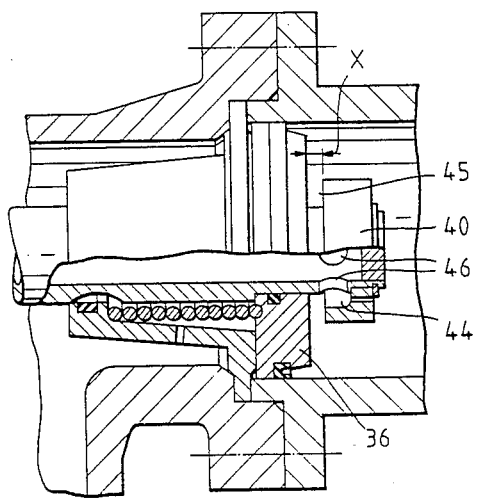
FIG. 4 is a fractional view of the valve according to FIGS. 2 and 3 after the piston has been displaced on the valve stem in order to open the passages for the closing fluid.

When the valve head 48 and thus the valve stem 28 engages the valve seat 18 and thereby comes to a halt, the piston 36 will continue to the position shown in FIG. 4. Thereby the openings 46 are exposed, and the injection gas is admitted into the inlet 14 through the hollow valve stem 28. The pressure on the piston 36 will now drop rapidly depending on the pressure of the injection fluid, the flow rate and the height X of the annular gap 45 leading into the annular chamber 44. When the pressure in the inlet 14 is the same as the pressure in the outlet 16 at the moment when the valve head 48 closes the passage 32, a condition for the valve to stay closed is that there is a certain pressure loss through the annular gap 45. If the inlet 14 is associated with a very small volume, it is not necessary to rely on a pressure drop across the annular gap. In such a case the height X is designed so that the annular gap 45 provides the same area as the sum of the openings 46. Even if the flow rate is 0, the valve will stay closed, provided that the areas and pressure differences of the movable parts provide a larger pressure force than the spring force. In this respect the difference in area between the piston 36 and the valve seat 18 is an important factor.

In practice the space into which the fluid is injected through the inlet 14, has a certain volume, and there will also be a certain flow leaving this volume. The height X must therefore be adjusted to the actual situation. For the rest, the valve will provide for a certain pressure difference between the pressure of the injection fluid and thereby the recipient (evaporator) on the one hand and the pressure in the outlet 16 and the main flow passage 32 on the other hand, the piston 36 moving back towards the cap 40 if the pressure difference across the piston 36 becomes too low. The piston 36 returns to the shoulder 41 when the pressure difference is again sufficiently high.

When the valve 9 is again to be opened upon completion of the injection, it will usually be sufficient simply to close the valve 10 so that the flow of injection fluid is shut off. The reason therefor is that a flow leaving the volume with which the inlet 14 is associated, will reduce the pressure in the system. After a relatively short time the spring force is larger than the pressure forces keeping the valve shut, and the spring 34 will therefore move the piston 36 and the valve stem 28 back into the starting position. When the piston 36 has engaged the cap 40 and the annular gap 45 is thus closed, the passage 47 will equalize the pressures. Additionally, there will usually be small leakages along the surface with which the piston 36 engages the cap 40, which will provide a sufficiently fast return movement.

If there is no flow from the volume into which the fluid is injected through the inlet 14, it is possible to equalize the pressure through a passage to the outlet 16 from the chamber on the right side of the piston 36 or from the inlet 14. Such a passage can be mechanically controlled by a shut-off valve. Alternatively, the passage may be provided by the throttle passage 60 provided that loss of injection fluid in the injection phase is acceptable.

It will be seen that the valve according to the invention acts both as a shut-off valve and as an injection valve, the shut-off function being first provided by means of the pressure of the injection fluid, whereupon the injection fluid will flow through the valve and be injected at the inlet side of the closed main flow passage.

What is claimed is:

1. A valve for shutting off or closing a main fluid flow through a main flow passage (32), comprising a valve stem (28) having a valve head (48) which may be operated to engage a valve seat (18) in order to close said passage, the valve stem carrying at the end remote from the valve head a piston (36) which operates in a cylinder (22) and can be actuated by a closing fluid against spring action in order to move the valve stem (28) and the valve head (48) into closed position, characterized in that the valve stem (28) is hollow and at the end at which the valve head (48) is provided, is open and at the opposite end has openings (46) opening into the interior of the hollow valve stem (28), and that the piston (36) is mounted for axial movement on the valve stem (28) to allow further movement towards the valve seat (18) against spring action when the valve head (48) has engaged the valve seat (18) and the valve stem (28) has therefore come to a halt, said further movement relative to the valve stem (28) opening a passage (45) into the openings (46) in the valve stem (28), whereby closing fluid will be injected into the main flow passage (32) at one side of the valve seat (18) through the valve stem.

2. A valve according to claim 1, characterized in that the cylinder chamber (30) on the side of the piston (36) not subjected to the closing and injection fluid, communicates with the main flow passage (32) through throttle passages (38) and is thus filled with the main fluid, which is compressed during the closing operation to provide a braking and damping effect on the closing movement of the valve stem.

3. A valve according to claim 2, characterized in that there is provided a relief passage (58) which immediately prior to the valve head (48) engaging the valve seat (18) is opened to provide rapid equalizing of the pressure difference between said cylinder chamber (30) and the main flow passage (32).

4. A valve according to any one of claims 1, 2 or 3 characterized in that there is provided a throttle passage (47, 60) from the cylinder chamber subjected to the closing and injection fluid pressure, to the other side of the valve seat (18) to relieve the pressure when the closing and injection fluid supply is closed, whereby the valve will be returned to open position by the spring force acting on the piston (36).

* * * * *